United States Patent [19]

Harris et al.

[11] Patent Number: 4,914,619
[45] Date of Patent: Apr. 3, 1990

[54] APPARATUS AND METHOD FOR INTERCONNECTING AN APPLICATION OF A TRANSPARENT SERVICES ACCESS FACILITY TO REMOTE SOURCE

[75] Inventors: John F. Harris, Endwell; Frederick A. Schwartz, Binghamton; Robert C. Will, Vestal, all of N.Y.

[73] Assignee: International Business Machines Corporation, Armonk, N.Y.

[21] Appl. No.: 109,366

[22] Filed: Oct. 19, 1987

[51] Int. Cl.⁴ .............................................. G06F 13/00
[52] U.S. Cl. ............................... 364/900; 364/978.1; 364/940.61; 364/228.2; 364/232.1
[58] Field of Search ... 364/200 MS File, 900 MS File

[56] References Cited

U.S. PATENT DOCUMENTS

| 4,388,686 | 6/1983 | Haid | 364/200 |
|---|---|---|---|
| 4,437,184 | 3/1984 | Cork et al. | 364/200 |
| 4,677,588 | 6/1987 | Benjamin et al. | 364/900 |

*Primary Examiner*—Gareth D. Shaw
*Assistant Examiner*—Gopal C. Ray
*Attorney, Agent, or Firm*—Pollock, Vande Sande & Priddy

[57] ABSTRACT

Apparatus and method for communicating between a virtual machine application of a transparent services access collection and an external resource outside the collection. A second virtual machine is provided within the collection, for servicing a request to the external resource. The second virtual machine converts a VM request to CONNECT from the first virtual machine to a VTAM allocate command. An interface is provided at the collection for mapping each VM verb to a VTAM verb, for transmission over the VTAM network. The interface is bi-directional whereby VTAM commands received by a collection are mapped and converted to a VM verb and associated protocol.

12 Claims, 9 Drawing Sheets

FIG. 4

| VM MACRO | VTAM MACRO | DETAIL |
|---|---|---|
| APPCVM CONNECT | APPCCMD CONTROL=ALLOC | FIGURE 5 |
| APPCVM SENDCNF | APPCCMD CONTOL=SEND, QUALIFY=CONFIRM | FIGURE 6 |
| APPCVM SENDCNFD | APPCCMD CONTROL=SEND, QUALIFY=CONFRMD | FIGURE 7 |
| APPCVM SEVER | APPCCMD CONTROL=DEALLOC | FIGURE 8 |
| APPCVM RECEIVE | APPCCMD CONTROL=PREPRCV | FIGURE 9 |
| APPCVM SENDREQ | APPCCMD CONTROL=SEND, QUALIFY=RQSEND | FIGURE 10 |
| APPCVM SENDDATA | APPCCMD CONTROL=SEND QUALIFY=DATA | FIGURE 11 |
| APPCVM SENDERR | APPCCMD CONTROL=SEND, QUALIFY=ERROR | FIGURE 12 |

APPCVM TO APPCCMD MAPPING SUMMARY: THIS TABLE SHOWS HOW VM FUNCTIONS (APPCVM) IN COLUMN 1 AND VTAM FUNCTIONS (APPCCMD) IN COLUMN 2 MAP IN THE INVENTION. COLUMN 3 SPECIFIES THE FIGURE CONTAINING MORE DETAIL FOR EACH FUNCTION.

| APPCVM PARAMETER | APPCCMD PARAMETER |
|---|---|
| LU_NAME IN PLIST | LUNAME= ON APPCCMD MACRO |
| MODE_NAME IN PLIST | LOGMODE= ON APPCCMD MACRO |
| TPN IN PLIST | TPN IN SUPPLIED FMH5 |
| TYPE=BASIC / MAPPED ON APPCVM MACRO | TYPE FLAG IN SUPPLIED FMH5 |
| RETURN=ALLOCD/IMMED ON APPCVM MACRO | QUALIFY=ALLOCD/IMMED ON APPCCMD MACRO |
| SYNCLVL=NONE/CONFIRM ON APPCVM MACRO | SYNC_LEVEL FLAG IN SUPPLIED FMH5 |
| PATHID FROM APPCVM PLIST | CONVID FROM APPCCMD RPL |
| RETURN CODE FROM APPC/VM PLIST | RETURN CODE FROM APPCCMD RPL |

FIG. 5

APPCVM CONNECT TO APPCCMD CONTROL=ALLOC DETAIL MAPPING

FIG. 6

| APPCVM PARAMETER | APPCCMD PARAMETER |
|---|---|
| PATHID= ON APPCVM MACRO | CONVID ON APPCCMD MARCO |
| REQUEST_TO_SEND INTERRUPT | REQUEST_TO_SEND INDICATION FROM APPCCMD RPL |
| RETURN CODE FROM APPC/VM PLIST | RETURN CODE FROM APPCCMD RPL |

APPCVM SENDCNF TO APPCCMD CONTROL = SEND, QUALIFY = CONFIRM DETAIL MAPPING

FIG. 7

| APPCVM PARAMETER | APPCCMD PARAMETER |
|---|---|
| PATHID=ON APPCVM MARCO | CONVID ON APPCCMD MARCO |

APPCVM SENDCNFD TO APPCCMD CONTROL=SEND, QUALIFY = CONFRMD DETAIL MAPPING

FIG. 8

| APPCVM PARAMETER | APPCCMD PARAMETER |
|---|---|
| PATHID= ON APPCVM MACRO | CONVID ON APPCCMD MARCO |
| TYPE=NORMAL ON APPCVM MACRO | QUALIFY=FLUSH ON APPCCMD MACRO |
| TYPE=ABEND ON APPCVM MACRO | QUALIFY=ABENDPROG ON APPCCMD MACRO |
| BUFFER= AND BUFLEN= ON APPCVM MACRO | AREA= AND RECLEN= ON APPCCMD MACRO |
| RETURN CODE FROM APPC/VM PLIST | RETURN CODE FROM APPCCMD RPL |

APPCVM SEVER TO APPCCMD CONTROL=DEALLOC
DETAIL MAPPING

FIG. 9

| APPCVM PARAMETER | APPCCMD PARAMETER |
|---|---|
| PATHID= ON APPCVM MACRO | CONVID ON APPCCMD MARCO |
| REQUEST_TO_SEND INTERRUPT | REQUEST_TO_SEND INDICATION FROM APPCCMD RPL |
| WHAT_RECEIVED INDICATION FROM APPCVM PLIST | WHAT_RECEIVED INDICATION FROM APPCCMD RPL |
| RETURN CODE FROM APPC/VM PLIST | RETURN CODE FROM APPCCMD RPL |

APPCVM RECEIVE TO APPCCMD CONTROL=PREPRCV
DETAIL MAPPING

FIG. 10

| APPCVM PARAMETER | APPCCMD PARAMETER |
|---|---|
| PATHID= ON APPCVM MACRO | CONVID ON APPCCMD MARCO |

APPCVM SENDREQ TO APPCCMD CONTROL=SEND,QUALIFY=RQSEND
DETAIL MAPPING

FIG. 11

| APPCVM PARAMETER | APPCCMD PARAMETER |
|---|---|
| PATHID=ON APPCVM MACRO | CONVID ON APPCCMD MARCO |
| BUFFER= AND BUFLEN= ON APPCVM MACRO | AREA= AND RECLEN= ON APPCCMD MACRO |
| REQUEST_TO_SEND INTERRUPT | REQUEST_TO_SEND INDICATION FROM APPCCMD RPL |
| RETURN CODE FROM APPC/VM PLIST | RETURN CODE FROM APPCCMD RPL |

APPCVM SENDDATA TO APPCCMD CONTROL=SEND,QUALIFY=DATA DETAIL MAPPING

FIG. 12

| APPCVM PARAMETER | APPCCMD PARAMETER |
|---|---|
| PATHID= ON APPCVM MACRO | CONVID ON APPCCMD MARCO |
| TYPE=PROG | SENSE= ON APPCCMD MARCO |
| TYPE=SVC | SENSE= ON APPCCMD MARCO |
| BUFFER= AND BUFLEN= ON APPCVM MACRO | AREA= AND RECLEN= ON APPCCMD MACRO |
| REQUEST_TO_SEND INTERRUPT | REQUEST_TO_SEND INDICATION FROM APPCCMD RPL |
| RETURN CODE FROM APPC/VM PLIST | RETURN CODE FROM APPCCMD RPL |

APPCVM SENDERR TO APPCCMD CONTROL=SEND,QUALIFY=ERROR DETAIL MAPPING

APPARATUS AND METHOD FOR INTERCONNECTING AN APPLICATION OF A TRANSPARENT SERVICES ACCESS FACILITY TO REMOTE SOURCE

The present invention relates to networked data processing systems. Specifically, a method and apparatus for linking a collection of interconnected virtual machines of the Virtual Machine System Product with a resource outside the collection is described.

Transparent services access facilities (TSAF) have been employed to permit users of a data processing system to communicate with other data processing systems in a collection of such systems. In TSAF, a plurality of nodes are included in a collection. Each node includes a mainframe computing unit comprising a central processing unit (CPU), memory and associated operating system and in some cases peripheral devices, such as printers, etc. Virtual machines are created in each processor of the nodes to permit individual users access to a central processing unit. A virtual machine within a central processing unit of one node can communicate using advanced program to program communication/VM (APPC/VM) program interfaces at each of the nodes of a collection. The APPC/VM program interface is in itself a virtual machine for a node, permitting bidirectional communication with other nodes, or transparently between virtual machines of a single processor.

The International Business Machines Corporation has sold and installed these collections, which consist of no more than eight (8) nodes. One aspect of the Virtual Machine/System Product (VMSP) is described in an IBM publication entitled "Transparent Service Access Facility Reference", 1986. With these collections of TSAF virtual machines, it is possible for an application running on a virtual machine of one node to communicate with a resource which is connected to another node within the collection. APPC/VM paths are created between nodes by creating in each node an APPC/VM program. The foregoing document describes how the links between nodes are set up using the APPC/VM application program interface.

APPC/VM communications, however, are limited to nodes of the same collection. Resources that are located outside of a TSAF collection, either in a second collection of processor nodes or to other equipment not associated with a TSAF service, are not available to an application running on a virtual machine within a collection.

The present invention is directed to permitting applications running on a virtual machine in a TSAF collection of VMSP to access resources outside the collection. This resource could be located in a second collection of TSAF virtual machines or, in some cases, in an unrelated data processing system.

SUMMARY OF THE INVENTION

It is an object of this invention to permit an application in a TSAF virtual machine collection to request and receive service from a resource outside of the collection.

It is a more specific object of this invention to provide an interface between a collection of TSAF services and a SNA network.

These and other objects are provided by an apparatus and method in accordance with the present invention. An interface is described for permitting virtual machine communications through a SNA network. The APPC/VM internode communications are interfaced with the standard VTAM LU 6.2 protocol to permit communications outside of the TSAF collection.

The present invention permits a one-to-one mapping of the APPC/VM communication protocol with the VTAM communication protocol. This will permit an application running in a TSAF collection to access a remote resource such as a printer, data bank file or other connected resources, via each interface. The interfaces are bidirectional, permitting VTAM-originated network requests to be received and mapped into the APPC/VM format for service within the collection. Thus, the facility for any application running on a processor node to communicate outside the collection containing the node is provided.

BRIEF DESCRIPTION OF THE FIGURES

FIG. 4 illustrates the mapping of the known VM macros in the VM communication system with the VTAM macros for VTAM network communication.

FIG. 5 illustrates the corresponding parameter lists for VM and VTAM for transformation of the CONNECT function to the ALLOC function.

FIG. 6 illustrates the corresponding parameter lists for doing a VM SENDCNF transformation to a VTAM COMFIRM function.

FIG. 7 illustrates the parameter list for a transformation of the VM SENDCNFD function to the VTAM CONFRMD function.

FIG. 8 illustrate the parameter lists for the VM transformation of APPCVM SEVER to the VTAM DEALOC.

FIG. 9 illustrates the corresponding parameter lists for transforming the VM APPCVM RECEIVE function to the VTAM PREPRCV function.

FIG. 10 illustrates the corresponding parameter lists for transforming the VM APPCVM SENDREQ function to the VTAM RQSEND function.

FIG. 11 illustrates its corresponding parameter list for transforming the SENDDATA function to the VTAM DATA function.

FIG. 12 illustrates the corresponding parameter list for transforming the APPCVM SENDERR function to the VTAM ERROR function.

DESCRIPTION OF THE PREFERRED EMBODIMENT

Figure 1:
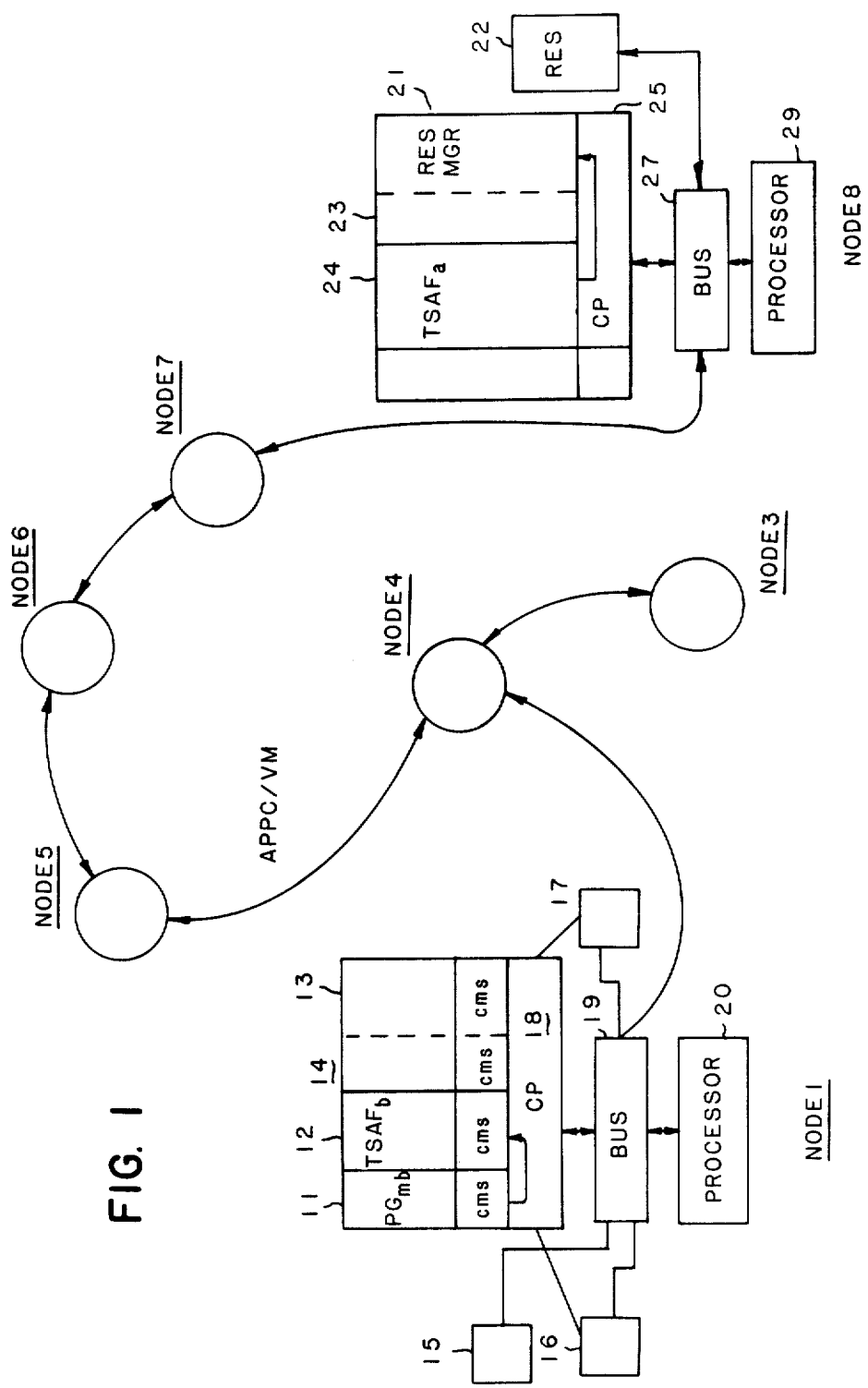
FIG. 1 is an illustration of a TSAF collection having an APPC/VM communication facility.

Referring now to FIG. 1, there is shown a TSAF collection of processor nodes. Processor node 1 is typical as including a mainframe processor 20. A bus 19 is shown which includes a connection to a memory 14 containing the control program 18. A plurality of terminals 15, 16 and 17 are shown linked to the bus 19.

Associated with the control program 18, stored in memory 14, are a plurality of virtual machines 11, 12, and 13. The virtual machines are formed by a second protocol CMS operating system stored in memory 14 which will provide a separate access to the processor 20, using the virtual machine created by the CMS architecture.

A first virtual machine 11 may be associated with input terminal 15. The user can execute an application program in the virtual machine 11. During execution of the application program, the virtual machine 11 may need access to one or more file servers or other resources within a collection. For instance, shown with respect to node 8 is a resource 22 which may be a file. Resource 22 is likewise connected through the bus 27 of its respective processor 29. The memory 25 includes a resource manager 21 created in one of the virtual machines provided on node 8.

Using the instructions set forth in the foregoing Virtual Machine/System Product document, it is possible for an application running in virtual machine 11 to communicate with and receive information from resource 22, independently of whether resource 22 resides in the same or different node.

The communication between nodes is controlled by an APPC/VM program shown as TSAFb loaded in virtual machine 12. This will provide communication protocol to other nodes within the collection. Connections between applications and resources can be established and severed at the request of the application program 11, data can be transmitted and received, and error control information will be supported by the virtual machine 12 having the TSAFb program. The particular protocol used to communicate between nodes is the APPC/VM interface.

Each of the other nodes, as is illustrated with respect to node 8, will also contain the APPC/VM program designated TSAFa. This program likewise occupies a virtual machine 24 of the node 8. Communications to other nodes are serially routed through this virtual machine. Every resource 22 associated with a given node will have a resource manager 21, also a virtual machine within the node. Thus, the resource manager can communicate with other nodes as well as within a node to other virtual machines by virtue of the TSAFa program in virtual machine 24 and related CP system services.

The intercommunication among nodes of a collection has been, in the past, limited to eight (8) nodes. Thus, TSAF using the APPC/VM protocol has not been utilized in communicating outside a collection.

Figure 2:
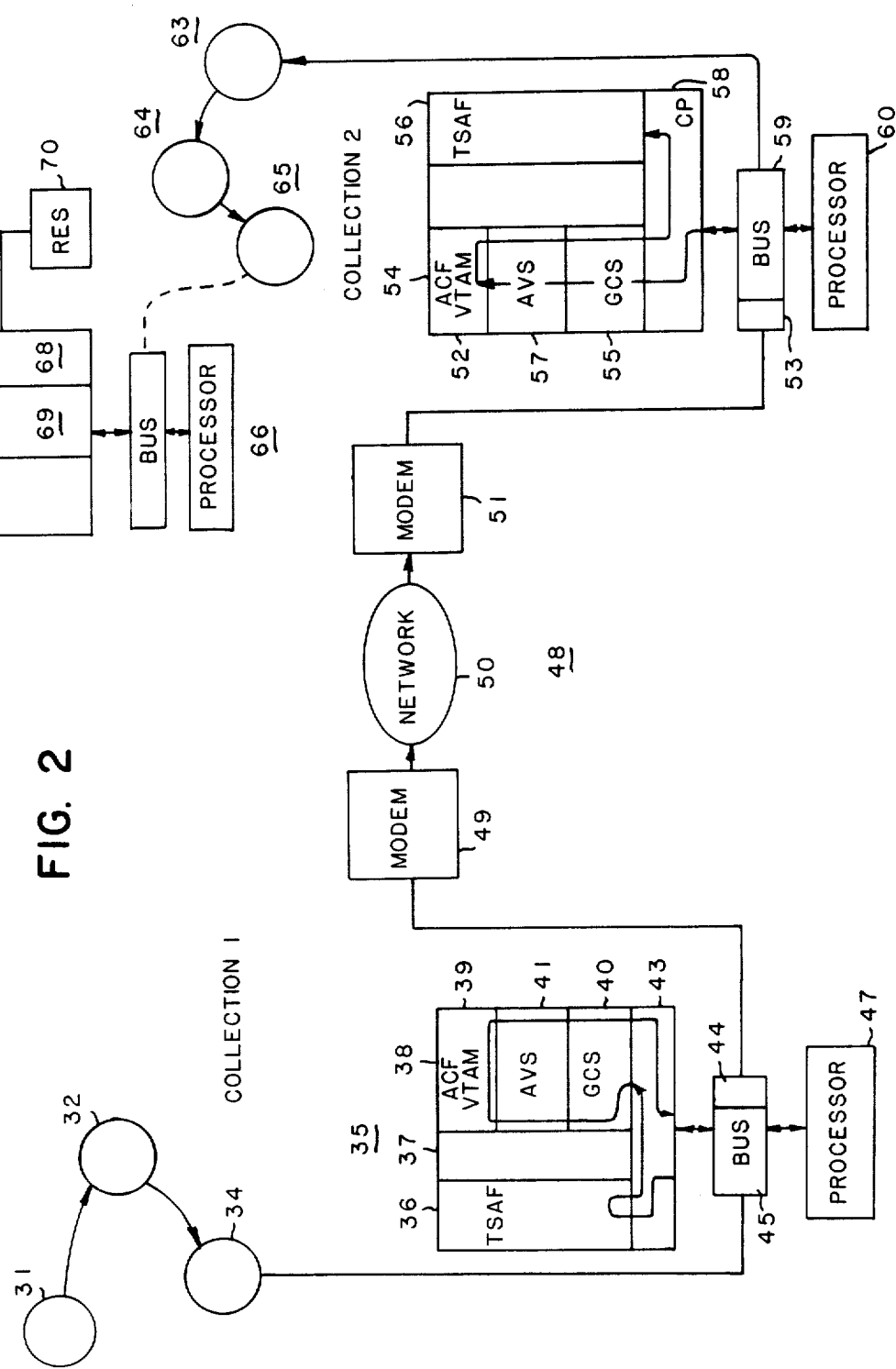
FIG. 2 illustrates an embodiment of the present invention which permits an application of a virtual machine to communicate from one collection to a resource in a second collection.

Referring now to FIG. 2, there is shown a technique in accordance with the present invention for communicating between two collections of TSAF systems.

The collection 1 is shown as having a node 35 which includes in one virtual machine 38 a gateway for interfacing the APPC/VM network of collection 1 with a virtual telecommunications access method (VTAM) network. An SNA network 48 is shown including a modem 49, VTAM network 50 and second modem 51. The VTAM network 50 can process the VTAM protocol communications and exchange information between collections.

In order to interconnect collections of transparent services access facilities, it is required that there be a VTAM to APPC/VM bidirectional interface in machine gateway 38. The gateway in machine 38 includes an application program AVS 41 running in a virtual machine of a node of collection 1. The virtual machine 38 includes a group control system GCS 40 described more particularly in VM/SP Group Control Systems Command and Macro Reference IBM SC24-520. An Advanced Communications Function for VTAM (ACF/VTAM) for virtual machines 39 is a subsystem managed by the GCS. This ACF/VTAM 39 supports SNA networks through the well known Virtual Telecommunications Access Method protocol.

An interface between the ACF/VTAM 39 and the virtual machine APPC/VM protocol is provided by AVS 41. Any applications running in collection 1 can communicate through AVS to obtain access to an application or resource 70 running in collection 2 through a VTAM transformation provided by AVS 41. Each verb of an APPC/VM communications is mapped to a VTAM equivalent and transmitted through bus 45, interface 44 to SNA NETWORK 48.

The control program 43 will, as before, communicate with a bus 45. The bus 45 is shown connected through an interface 44 to a standard SNA network 48. SNA network 48 may comprise a pair of modems 49, 51 and a connected network 50.

Similarly, SNA generated traffic is received on bus 59 in collection 2 through interface 53. The SNA VTAM encoded traffic is routed to a virtual machine 54. Virtual machine 54 is the same as that of 38 in collection 1, providing conversion from the VTAM protocol to the APPC/VM protocol. A TSAF 56 will process the APPC/VM converted traffic from virtual machine 54 just as APPC/VM traffic from any other node is processed. The bus structure 59 for processor 60 are, of course, common to all nodes in the collection. The collection 2 is seen to comprise additional nodes 63, 64, 65, and 66. Node 66 includes a TSAF virtual machine 69 for communicating between nodes.

Assuming that an application program is running on the virtual machine 37 of collection 1 that calls for a resource 70 on node 66 in collection 2, the VM/VTAM gateway of each collection is called into use. The request in the application program of virtual machine 37 is configured to request a service in the APPC/VM communication format. Virtual machine 38 will recognize this as a request for a resource outside of collection 1. The resource manager 68 can, of course, be a server associated with a disk file or other peripheral device located in collection 2 which serves as a resource 70.

The user request will, as with internode requests, select a buffer location for storing any information received in response to a request.

GCS 40 is shown as a virtual machine supervisor that supports subsystems VTAM 39 and AVS 41. The AVS gateway is a VTAM application and it runs under control of the GCS 40. VTAM 39 will find or establish an LU 6.2 session between the gateway 38 and the location in memory of the virtual machine 54 in collection 2. This communication protocol is described more particularly in an IBM publication entitled "Systems Network Architecture Transaction Programmer Reference Manual for LU Type 6.2". VTAM 39 is that portion of a VTAM system which can make and break connections, as well as provide the requisite protocol during a session, and send a data frame during said session.

The VM and VTAM communicating protocols operate from a macro and parameter list. The VM macro name is identified as APPC VM and the VTAM macro name is APPCCMD. The VM parameter list is known as the PLIST and the VTAM parameter list is known as the REQUEST PARAMETER LIST (RPL). The VM interface and protocol is fully described in the Transparent Services Access Facility reference SC24-5287 while the VTAM interface is fully described in VTAM Programming for LU6.2, SC30-3400. Those skilled in the programming of mainframe computing systems will recognize each of the documents as providing complete information as to the actual value of inputs and outputs and how to code each macro.

The table of FIG. 4 illustrates the mapping which is to be accomplished between VM and VTAM by the AVS 41.

The foregoing tables of VM and VTAM functions are interfaced to provide the communications outside of a collection.

The details for implementing each of these listed VM functions are given in the tables of FIGS. 5-12. From each of these tables it is possible to obtain a VTAM conversion for each given VM function, or a VM conversion from VTAM as the tables are bidirectional. To illustrate, the APPCVM CONNECT to APPCCMD ALLOC function will be discussed in some detail with respect to FIGS. 3A, 3B, and 3C.

Prior to the detailed description of these figures, FIG. 5 illustrates the parameters from the VM macro which are required for doing the conversion of a VM CONNECT to the VTAM ALLOC. By referring to each of the parameters of the VM macro which support the connections within a collection, it is possible to obtain the information for determining the equivalent VTAM parameter.

Figure 3A:
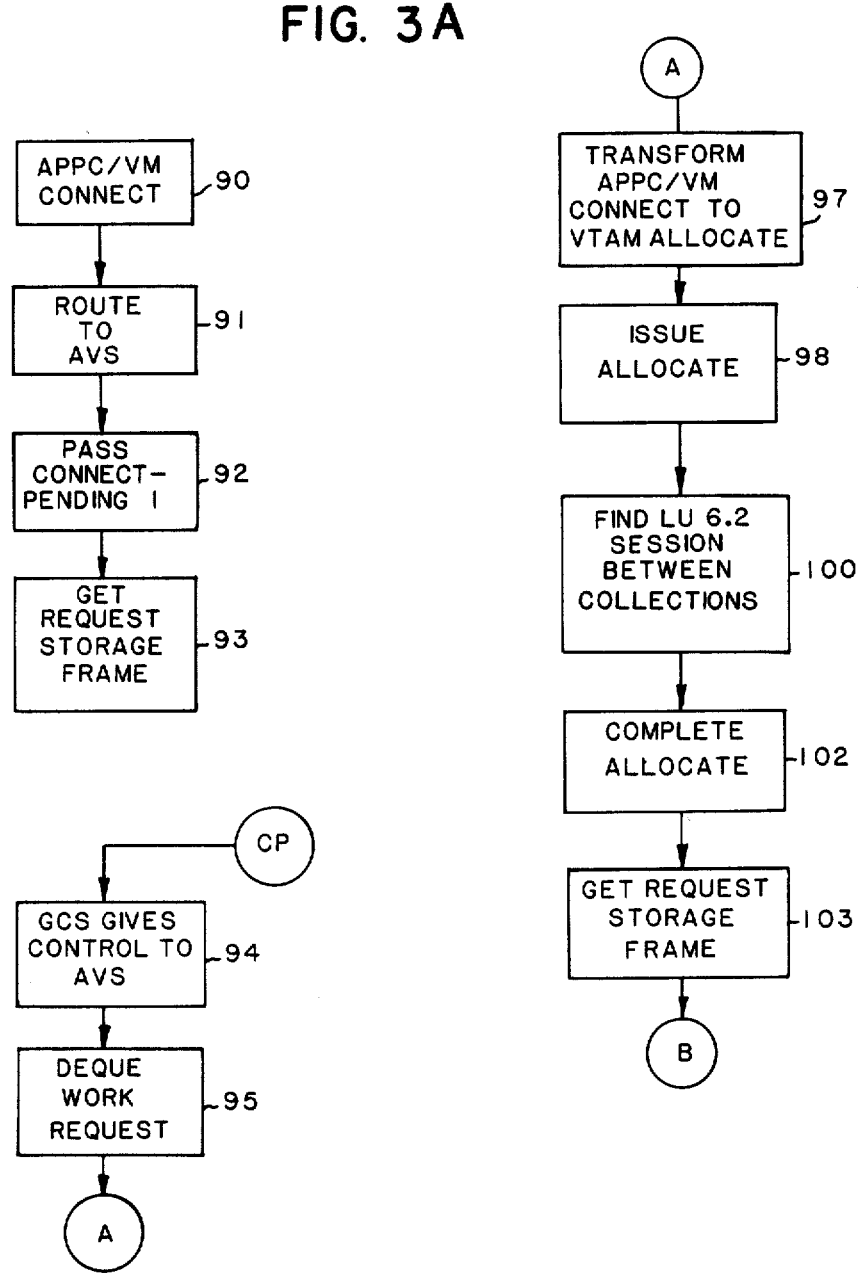
FIGS. 3A, 3B and 3C illustrate the programming of a virtual machine gateway in each of the collections of FIG. 2 to transform a APPC/VM CONNECT to a APPC/VTAM ALLOCATE function.
Figure 3B:
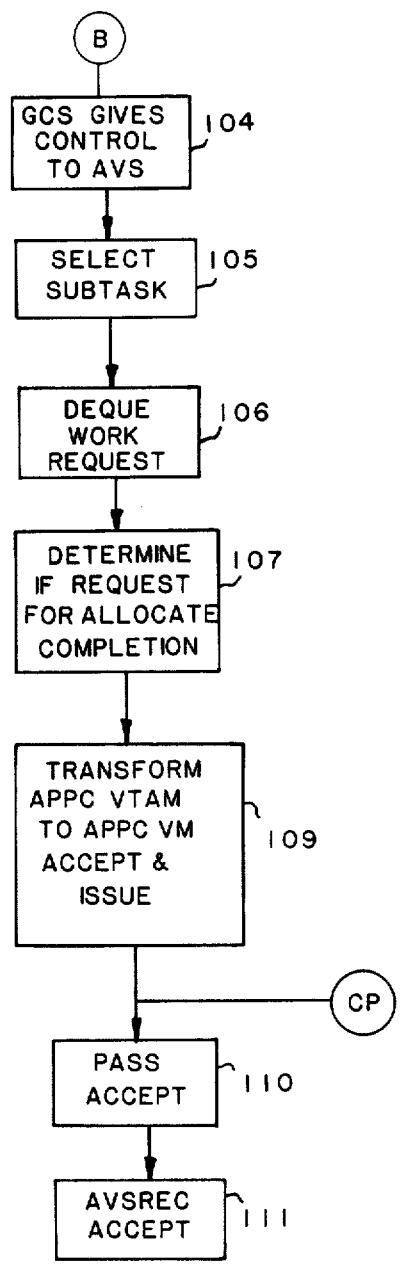
Figure 3C:
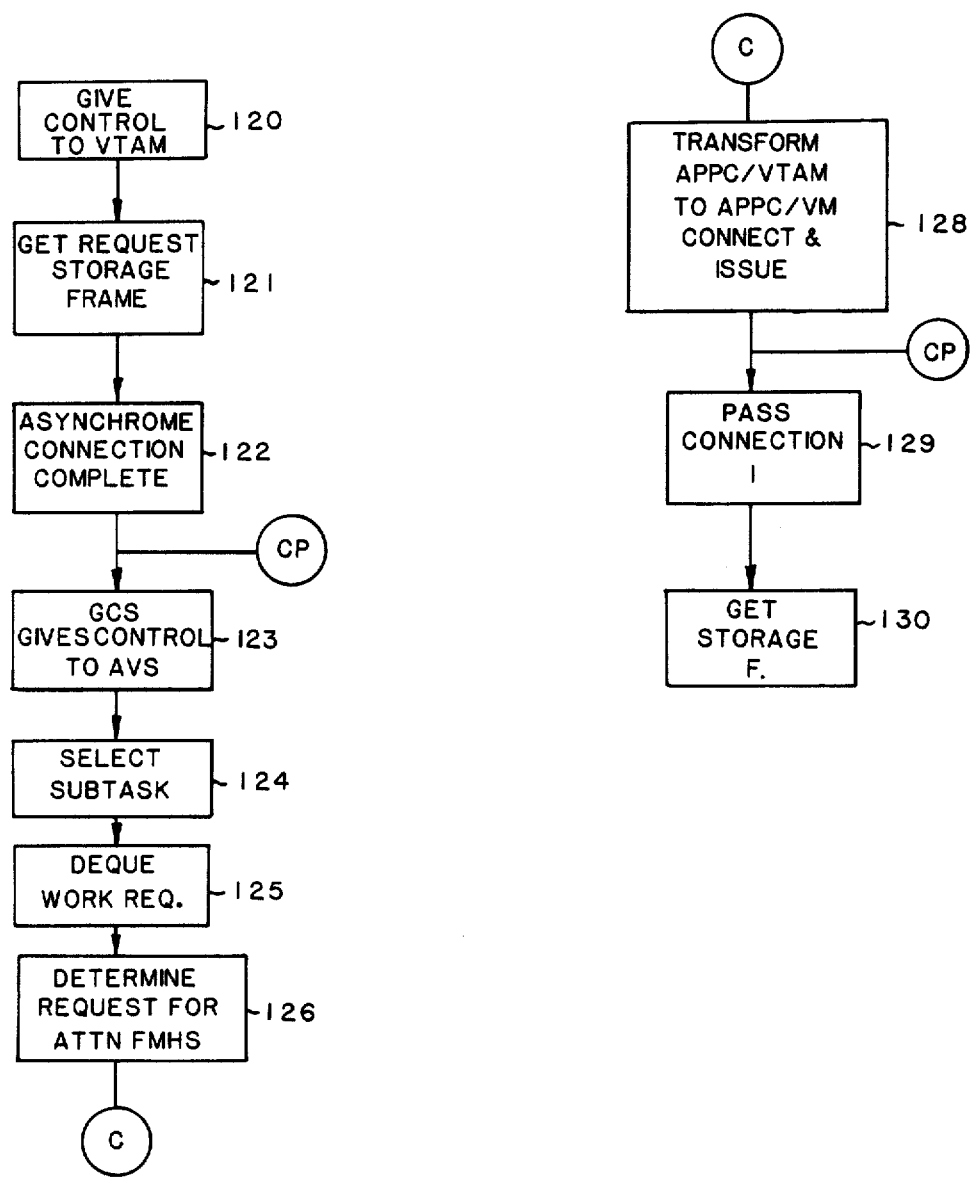

Referring now to FIG. 3A, there is shown the start of a request 90 by an application to create a session with a remote source. We will assume the application to be running in virtual machine 37, requesting service from a resource 70 controlled in another collection by resource manager 68. When the application wants to connect to resource manager 68 it issues a request connect to the remotely located resource manager 68 by issuing an APPC/VM CONNECT 90. The request is routed in step 91 to the AVS gateway virtual machine gateway via control program 43. The routed connection is received in GCS 40, and an interrupt is generated in step 92. The interrupt 92 will initiate a request for a storage frame 93 in AVS 41 which serves as a work request for the connection to be set up. Control is given to the AVS dispatcher by CP 43 and GCS 40 in step 94. The work request is dequeued in step 95 and a transformation begins.

The transformation which occurs in the AVS 41 is a transformation 97 from an APPC/VM connect, used within a collection, to an APPC/VTAM allocate request 98, which is used to cross the boundary into a VTAM SNA network. The allocate is, of course, a VTAM parameter which is used to create a connection with a logical unit located on the VTAM network. The VTAM 39 will, having received an allocate 98, establish a session in step 100 between the remote logical unit of collection 2, which in this case is virtual machine 54, and the gateway of virtual machine 38. As those familiar with VTAM protocol indicate, a complete allocate function 102 is generated once the VTAM allocate has been initiated.

The APPC allocate output 102, which is produced during the VTAM allocation procedure, is stored in a storage frame in step 103. The GCS 40 will then give control to the AVS dispatcher in step 104.

The AVS 41 will select a subtask for execution in step 105. AVS will deque the storage frame previously stored as a work request, will determine whether or not the previous storage frame contains the APPC allocate output in step 107. At this time, the APPC allocate output is transformed into an APPC/VM accept in step 109. The accept is the VM equivalent of an APPC/VTAM ALLOCATE COMPLETE, indicating to the collection that an ALLOCATE has been completed.

The transformed accept is passed as an interrupt in step 110 when the control program next enables the GCS 40. The AVS 41 receives the ACCEPT indication that the ALLOCATE/CONNECT has completed.

During this portion of the establishment of a connection between virtual machines 38 and 54, a handshake protocol in virtual machine 54 has occurred to produce the APPC allocate output which occurred in virtual machine 38. The GCS 55 of virtual machine 54 will initially give control to VTAM 52 in step 120. VTAM 52 will give control to its associated AVS 57 gateway to complete the asynchronous communication with the virtual machine 38 of collection 1 in step 121. VTAM 52 provides for an asynchronous completion with the incoming allocate request issued by collection 1. A storage frame is selected in step 122 to receive an indication that an asynchronous completion is being conducted by VTAM 52 and control is given back to GCS 55 in step 123. The previously stored asynchronous completion in step 122, is selected, dequeud, and determined as an ATTN FMH5 in steps 124-126. This APPC/VTAM indication, ATTN FMH5, is transformed to APPC/VM CONNECT in step 128. The transformed CONNECT is issued and passed in a storage frame in step 128. The GCS 55 will get control in response to the data in this storage frame, delivering a control to the AVS 57 in step 130. The AVS is then informed that VTAM 52 has completed an asynchronous connection with VTAM of virtual machine 38.

The foregoing description exemplifies only one of the basic VM verb types used to make connections, and send and receive data within a collection. These VM requests, of which the CONNECT is only one, have VTAM equivalents. The remaining VM to VTAM macro and parameter conversions can be similarly made using routine programming skills, thus completely mapping VM initiated traffic to VTAM traffic.

The foregoing tables of FIGS. 5-12 are bidirectional permitting any received VTAM communication to be mapped into VM equivalents. Although described as a system for communicating between APPC/VM collections, it is clear that it is possible to use the invention to communicate between a collection and any VTAM supported system.

Having thus described our invention, what we claim as new, and desire to secure by Letters Patent is:

1. A method of communication between a first virtual machine in one collection of transparent services access facilities which communicate with each other using APPC/VM format and a resource of another collection comprising the steps of:
   connecting said collections through first and second VTAM interfaces;
   generating a request in APPC/VM format in an application program contained in said first virtual machine to access a resource manager contained in said another collection;
   decoding in a second virtual machine in said one collection containing said first virtual machine said APPC/VM request to connect to said resource;
   transforming said first virtual machine APPC/VM request through a gateway into a VTAM ALLOCATE REQUEST, and a VTAM message;

initiating said VTAM ALLOCATE REQUEST through said first VTAM interface to the second interface, whereby a session is established between said collections;

transferring said VTAM message over said session to said second interface;

transforming said transferred VTAM message to a virtual machine APPC/VM request; and, executing in a second virtual machine of said another collection comprising said resource manager said transformed virtual machine APPC/VM request whereby said resource manager processes said virtual machine request.

2. The method of communication of claim 1 further comprising the steps of:

transforming a response from a resource managed by said resource manager to a second VTAM message;

transferring said second VTAM message through said second interface to said first interface;

transforming said second VTAM message into an APPC/VM virtual machine message; and storing said APPC/VM virtual machine message in a buffer location identified by said application program.

3. The method of claim 1 wherein said first and second interfaces are connected to each other through a SNA network.

4. An apparatus for communicating between an application and resource in first and second transparent services access collections comprising:

a first virtual machine in a first node of said first collection for supporting said application, said first virtual machine issuing an APPC/VM request for service from said resource;

a second virtual machine in said first collection including a controller for transferring said APPC/VM request, and a gateway for converting said APPC/VM request into a VTAM connection request and a VTAM data frame;

a first bidirectional interface for connecting said second virtual machine gateway to a VTAM network;

a second bidirectional interface connected to said VTAM network, and a third virtual machine in a node of said second collection, said third virtual machine including a gateway for converting a VTAM connection request and VTAM data frame received from said second bidirectional interface to an APPC/VM data frame, said second and third virtual machines establishing a VTAM connection between said first and second interfaces; and, a resource manager connected to said third virtual machine for executing requests forwarded by said third virtual machine via said APPC/VM data frame, and passing information from a related resource to said third virtual machine.

5. The apparatus of claim 4 wherein said resource manager is located on a different node than said third virtual machine.

6. The apparatus of claim 4 wherein said first and second bidirectional interfaces are connected together through a SNA network.

7. An apparatus for communicating between a first virtual machine application of a transparent services access collection and an external resource outside said collection comprising:

(a) a second virtual machine within said collection, for servicing a request to connect to said external resource, said second virtual machine converting a APPC/VM request to connect from said first virtual machine to a VTAM ALLOCATE command and completing an incoming VTAM ALLOCATE, said second virtual machine converting incoming VTAM data frames to virtual machine APPC/VM data frames, and outgoing virtual machine data frames to VTAM data frames; and, (b) a bidirectional interface connected to said second virtual machine; for connecting said outgoing VTAM ALLOCATE and VTAM outgoing data frame to a VTAM network, and for completing an incoming VTAM ALLOCATE with said second virtual machine to permit incoming VTAM data frames to be received by said second virtual machine and converted to APPC/VM data frame.

8. The apparatus of claim 7 wherein said bidirectional interface is connected to a SNA network.

9. The apparatus of claim 7 wherein said bidirectional interface includes a MODEM connected to a bus of the processor which supports said second virtual machine.

10. An apparatus for communicating between a virtual machine application of a transparent services access collection and an external resource outside said collection comprising:

a virtual machine supervisor within said collection supporting a VTAM interface which can establish connections using a VTAM protocol, and a gateway for transforming APPC/VM connection protocol from said virtual machine application to VTAM protocol;

a second transparent services access collection;

a second virtual machine supervisor located in said second collection of transparent services, supporting a second VTAM interface, and a second gateway for transforming VTAM connection protocol from VTAM protocol to APPC/VM protocol;

a resource located in said second collection which is accessed by VM application requests;

a SNA network connecting said VTAM interfaces to each other;

whereby VM application request for access from said virtual machine application are transformed into a VTAM connection and message data for accessing said resource across said SNA network.

11. The apparatus of claim 10 wherein said VTAM interface establishes communication with said second VTAM interface using LU TYPE 6.2 protocol.

12. The apparatus of claim 11 wherein said VTAM interfaces are bidirectional.

* * * * *

UNITED STATES PATENT AND TRADEMARK OFFICE
CERTIFICATE OF CORRECTION

PATENT NO. : 4,914,619

DATED : April 3, 1990

INVENTOR(S) : Harris et al

It is certified that error appears in the above-identified patent and that said Letters Patent is hereby corrected as shown below:

In column 1, line 21, change "processor" to --processing unit--.

In column 3, line 63, after "in" insert --virtual--; on line 64, delete "gateway".

In column 4, line 3, change "39" to --38--; on line 10, after "AVS" insert --41--.

In column 5, line 66, change "deque" to --dequeue--.

In column 6, line 25, change "dequeud" to --dequeued--.

Signed and Sealed this

Nineteenth Day of May, 1992

Attest:

DOUGLAS B. COMER

*Attesting Officer*  *Acting Commissioner of Patents and Trademarks*